Patented June 21, 1932

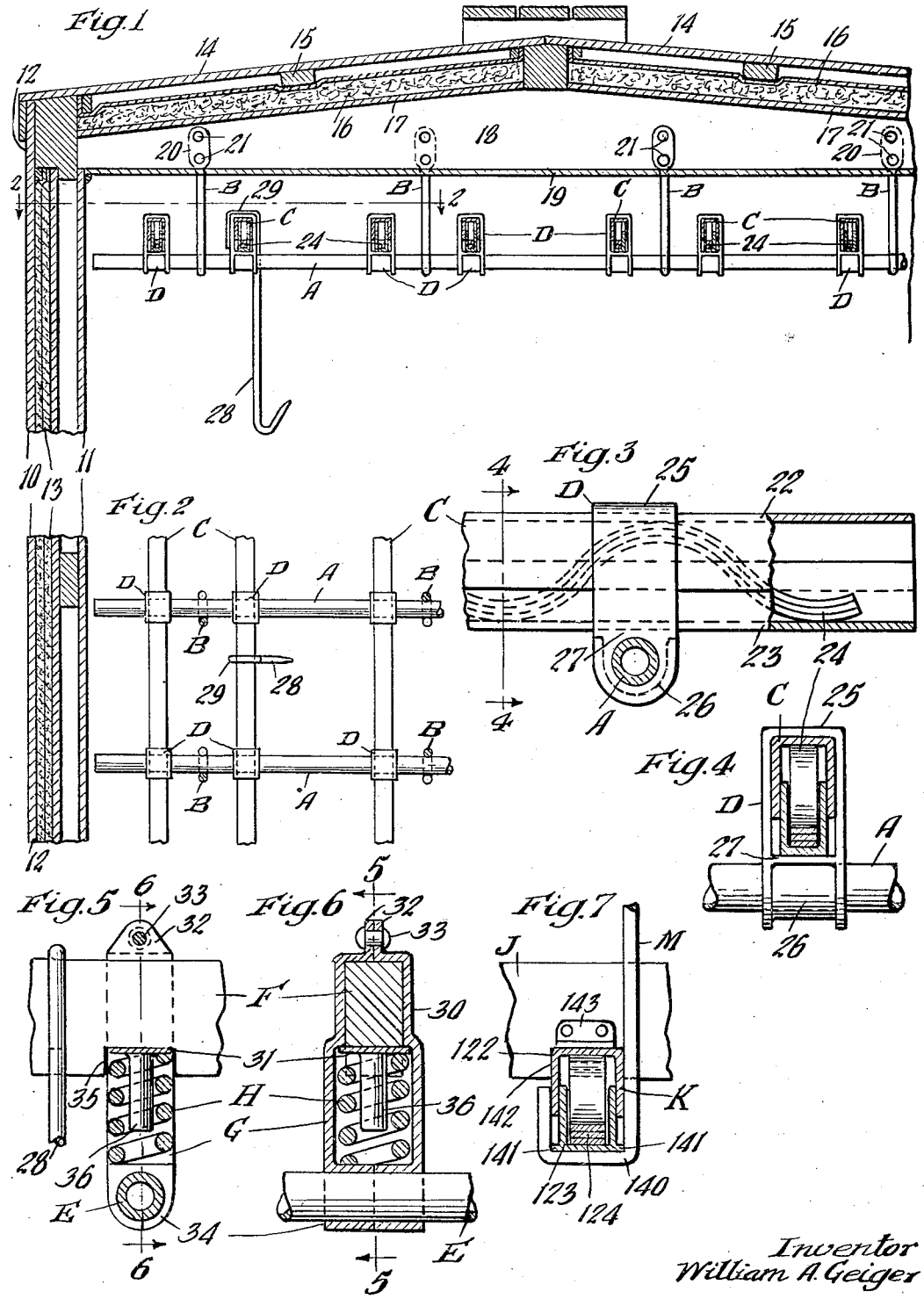

1,863,714

UNITED STATES PATENT OFFICE

WILLIAM A. GEIGER, OF CHICAGO, ILLINOIS, ASSIGNOR TO W. H. MINER, INC., OF CHICAGO, ILLINOIS, A CORPORATION OF DELAWARE

MEAT RACK

Application filed July 18, 1931. Serial No. 551,686.

This invention relates to improvements in meat racks.

In the transportation of meat by refrigerator cars, it is the usual practice to provide racks from which the meat is suspended by hooks. Damage to the meat is frequently caused in transit by the meat being shaken and torn from the supporting hooks through excessive, violent vibrations imparted to the car body by the action of the truck springs due to inadequate cushioning of the shocks.

The main object of my invention is to overcome this difficulty by providing a shock absorbing rack, whereby the shocks transmitted to the rack are properly cushioned, thus protecting the load suspended from the rack from damage.

Another object of the invention is to provide a supporting rack including yielding cushioning means for absorbing shocks imparted to the rack.

A more specific object of the invention is to provide a meat rack of the character described, located within the car and suspended from the car structure below the roof, including transversely spaced bars and longitudinally extending beams supported on the bars from which the usual meat hooks are suspended, wherein resilient means is employed to absorb the shocks transmitted from the bars to the beams.

Other objects of the invention will more clearly appear from the description and claims hereinafter following.

In the drawing, forming a part of this specification, Figure 1 is a transverse, vertical sectional view through the upper portion of a refrigerator car, illustrating my improvements in connection therewith. Figure 2 is a horizontal sectional view, partly broken away, corresponding substantially to the line 2—2 of Figure 1. Figure 3 is a part elevational and part longitudinal, vertical sectional view, illustrating one of the longitudinal beams of my improved meat rack structure as shown in Figures 1 and 2, together with one of the transverse bars which is shown in vertical section, the beam being broken away and the view being shown on an enlarged scale. Figure 4 is a vertical sectional view, corresponding substantially to the line 4—4 of Figure 3. Figure 5 illustrates another embodiment of the invention, being a vertical sectional view through one of the transverse beams of the meat rack and showing one of the longitudinal beams in elevation, the beam being broken away and the section corresponding substantially to the line 5—5 of Figure 6. Figure 6 is a vertical sectional view, corresponding substantially to the line 6—6 of Figure 5. And Figure 7 is a view similar to Figure 5, illustrating still another embodiment of the invention.

Referring first to the embodiment of the invention illustrated in Figures 1 to 4, inclusive, 10 indicates the side wall of a refrigerator car, said wall comprising an inner sheathing 11 and an outer sheathing 12 and interposed insulating material 13. The car roof is indicated by 14 and is supported by the usual longitudinally extending beams 15—15. Insulation 16 is provided on the inner side of the roof and is covered and protected by an inner sheathing 17.

The usual carlings 18 are provided for supporting the roof, and my improved meat rack is suspended therefrom. The car is also provided with the usual ceiling 19, which is secured to the bottom of the carlings 18.

My improved meat rack, as illustrated in Figures 1 to 4 inclusive, comprises broadly transverse bars A—A, supporting hooks B—B, longitudinally extending resilient beams C—C, and combined supporting and guide brackets D—D.

The bars A—A, which are disposed transversely of the car and spaced lengthwise thereof, as clearly shown in Figure 2, are in the form of tubular members. These bars are suspended from the top of the car by means of the hooks B—B, which have their upper ends fixed to the carlings 18. As shown, four such hooks are provided for supporting each bar A. Each hook B has the shank portion provided with a hooked lower end within which the bar A is seated. At the upper end, the shank of the hook member B is flattened as indicated at 20, said flattened portion being secured to the side of the corresponding carling 18 by any suitable means, such as bolts or screws 21—21.

The longitudinally disposed beams C—C are supported on the bars A and, as shown in Figures 1 and 2, are spaced laterally with respect to each other. As shown in Figure 1, two beams C—C are disposed between each pair of supporting hook members B—B, and a single beam is disposed between each side wall of the car and the adjacent supporting hook B. Each beam C comprises top and bottom channel-shaped sections 22 and 23, the flanges of the channel-shaped section 22 being telescoped over the flanges of the section 23. The top channel section 22 is resiliently supported on the section 23 by spring means 24. As shown in Figure 3, this spring means is preferably in the form of elongated plate members of ogee formation.

The combined supporting and guide brackets D—D are in the form of castings comprising a yokelite upper loop section 25, which is adapted to receive and inclose the two sections 22 and 23 of the cooperating beam member C. At the bottom portion, each casting D is provided with a sleevelike portion 26, which is transversely disposed and accommodates the corresponding section of one of the transverse bars A. In order to fix each bracket D to the corresponding bar A, the same is preferably spot welded thereto. As will be evident, the telescoped sections 22 and 23 of the beams C—C are guided in the upper portions of the brackets D, and relative approach of the sections of each beam C is limited by the lower end edges of the side flanges of the upper section 22 engaging the transverse bottom wall 27 of the guide section of the corresponding guide bracket D. By thus limiting the relative movement of the two sections 22 and 23 of each beam C, toward each other, excessive compression of the spring 24 is prevented.

One of the meat supporting hooks of the rack structure is shown in Figure 1 and is indicated by 28. As will be understood, a plurality of such hook members 28 are employed and each is of substantially the shape shown in Figure 1, the upper end 29 of the shank portion of each hook being engaged over the upper section 22 of the corresponding beam C and formed so as to fit this section.

In absorbing the shocks imparted to the rack structure, the vibrations will be cushioned by the springs 24 of the beams C—C, the springs 24 yieldingly resisting relative approach of the telescoped sections 22 and 23 of each beam C. The shocks imparted to the rack are thus effectively cushioned so as to prevent excessive jarring of the hooks 28, thereby protecting the meat suspended therefrom from damage.

Referring next to the embodiment of the invention illustrated in Figures 5 and 6, the meat rack structure comprises transversely disposed bars and longitudinally disposed beams, which form a grid structure similar to that involved in the embodiment of the invention described in connection with Figures 1 to 4 inclusive. However, the beams are not resilient, shock absorbing means being employed between the bars and beams to cushion excessive vibrations. In Figures 5 and 6, one of the transverse bars is shown, the same being indicated by E. This bar is of precisely the same form as the bar A described in connection with Figures 1 to 4 inclusive, being supported from the carlings of the refrigerator car by means of hooks similar to the hooks B hereinbefore described. The longitudinal members on which the meat hooks are suspended are in the form of wooden beams in the form of the invention shown in Figures 5 and 6, one of these beams only being shown and being indicated by F. The beams F of the rack structure are supported by combined supporting and guide brackets, only one of which is shown and is indicated by G. The guide bracket G has an upper loop section 30 which accommodates the corresponding portion of the beam F, a shock absorbing spring H, and a spring follower 31. As shown, the bracket G is of two-part construction, being divided on a central vertical plane. At the upper end, each section of the bracket G is provided with an upstanding ear 32. The two sections of the bracket are secured together at the upper end by a rivet 33 extending through the ears 32—32. At the bottom end, the bracket G is provided with a tubular section 34, which is formed partly on each section of the bracket and receives the corresponding section of one of the transverse bars E of the rack structure. The sleeve section 34 is preferably spot welded to the corresponding bar E to prevent displacement of the bracket on said bar. The upper section of the loop portion 30 of the bracket G is reduced in width, as clearly shown in Figure 6, so as to fit the beam F and tightly clamp the same. The lower portion of the section of the beam F disposed within the bracket G is preferably recessed, as indicated at 35, and the spring follower 31 is seated in said recess. The spring follower cooperates with the upper end of the spring H and has a central stem 36 extending into the coil of the spring, said stem forming a limiting stop for restricting the compression of the spring H by engagement with the bottom wall of the spring seat of the casting G.

As will be evident, vibrations imparted to the rack through the supporting bars E will be cushioned by the springs H of the combined guide and supporting brackets, thereby reducing the vibrations imparted to the beams F to such an extent that the meat suspended from the hooks 28 will not be torn off the hooks.

Referring next to the embodiment of the invention illustrated in Figure 7, the rack is in the form of a grid-like structure similar to that described in connection with Figures 5 and 6. The longitudinal beams of the rack structure involved in Figure 7 are similar to the beams F described in connection with Figures 5 and 6, one of such beams being shown in Figure 7 and indicated by J. The beams J are supported by transverse bars, one of which is shown in Figure 7 and indicated by K. The transverse bars are of resilient construction, each comprising channel-shaped members similar to the channel-shaped members composing the beams C—C described in connection with Figures 1 to 4 inclusive. The bar K, the channel-shaped top and bottom sections of which are indicated respectively by 122 and 123, is supported by a plurality of hooks M, which are of substantially the same design as the hooks B hereinbefore described. The hooks M have the hook portions proper 140 thereof formed so as to accommodate the rectangular cross-sectional shape of the corresponding bar K. The lower section 123 of the bar K is provided with longitudinally extending, horizontally disposed bottom flanges 141—141 adapted to act as limiting stops for the side flanges of the top channel section 122. A plate spring 124 composed of a plurality of sections, similar to the spring 24 hereinbefore described, is interposed between the sections 122 and 123 of each bar and yieldingly resists approach of these sections. The beam J is preferably notched on the under side, as indicated at 142, to accommodate the upper portion of the section 122 of the bar K. In order to prevent displacement of the beam J on the bar K, an angle bracket 143 is provided, the flanges of which are respectively secured to the beam J and the upper section 122 of the bar K.

Shocks imparted to the rack structure illustrated in Figure 7 will be absorbed by the springs 124, which yieldingly resist relative approach of the sections 122 and 123 of the bar K. The bars K, as will be clear, thus form resilient members for supporting the beams J—J, thereby effectively cushioning the shocks transmitted to the hooks on which the meat is supported.

I have herein shown and described what I now consider the preferred manner of carrying out my invention, but the same is merely illustrative and I contemplate all changes and modifications that come within the scope of the claims appended hereto.

I claim:

1. In a meat rack for refrigerator cars, the combination with spaced bars supported on the car structure; of spaced beams supported on said bars and arranged transversely of the same; meat hooks suspended from said beams; and yielding cushioning means forming a part of said rack structure for absorbing shocks imparted thereto.

2. In a meat rack for refrigerator cars, the combination with spaced bar members supported on the car structure; of spaced meat hook supporting beam members supported on said bar members, certain of said members being resilient to absorb shocks transmitted to said rack structure.

3. In a meat rack for refrigerator cars, the combination with connected bars forming a gridlike rack structure for suspending meat supporting hooks; of shock absorbing means forming the connection between said bars.

4. In a meat rack for refrigerator cars, the combination with spaced bars suspended from the car structure; of spaced meat hook supporting beams arranged transversely of said bars and supported thereby, said beams being resilient to absorb shocks.

5. In a meat rack for refrigerator cars, the combination with spaced bars suspended from the car structure; of spaced meat hook supporting beams arranged transversely of said bars and supported thereby, said beams being yieldingly compressible to absorb shocks.

6. In a meat rack for refrigerator cars, the combination with spaced bars suspended from the car structure; of spaced meat hook supporting beams arranged transversely of said bars and supported thereby, each of said beams being of two-part construction and having shock absorbing means interposed between said parts.

7. In a meat rack for refrigerator cars, the combination with spaced bars suspended from the car structure; of spaced meat hook supporting beams arranged transversely of said bars and supported thereby, each of said beams comprising top and bottom sections; and yielding means interposed between said sections.

8. In a meat rack for refrigerator cars, the combination with spaced bars suspended from the car structure; of spaced meat hook supporting beams arranged transversely of said bars and supported thereby, each of said beams being divided lengthwise into top and bottom telescoped sections; and yielding means interposed between said sections.

9. In a meat rack for refrigerator cars, the combination with spaced bars suspended from the car structure; of spaced meat hook supporting beams arranged transversely of said bars and supported thereby, each of said beams comprising top and bottom channel-shaped sections telescoped with respect to each other; and plate spring means interposed between said sections and yieldingly supporting said top section on said bottom section.

10. In a meat rack for refrigerator cars, the combination with spaced bars suspended from the car structure; of spaced meat hook supporting beams arranged transversely of said bars and supported thereby, each of said beams comprising top and bottom channel-shaped sections telescoped with respect to each other; plate spring means interposed between said sections and yieldingly supporting said top section on said bottom section; and supporting brackets fixed to said bars, said brackets having guide means embracing said beams.

11. In a meat rack for refrigerator cars, the combination with spaced bars suspended from the car structure; of spaced meat hook supporting beams arranged transversely of said bars and supported thereby, said bars being yieldingly compressible to absorb shocks.

12. In a meat rack for refrigerator cars, the combination with spaced bars suspended from the car structure; of spaced meat hook supporting beams arranged transversely of said bars and supported thereby, each of said bars being of two-part construction and having shock absorbing means interposed between said parts.

13. In a meat rack for refrigerator cars, the combination with spaced bars suspended from the car structure; of spaced meat hook supporting beams arranged transversely of said bars and supported thereby, each of said bars comprising top and bottom sections; and yielding means interposed between said sections.

14. In a meat rack for refrigerator cars, the combination with spaced bars suspended from the car structure; of spaced meat hook supporting beams arranged transversely of said bars and supported thereby, each of said bars being divided lengthwise into top and bottom telescoped sections; and yielding means interpose between said sections.

15. In a meat rack for refrigerator cars, the combination with spaced bars suspended from the car structure; of spaced meat hook supporting beams arranged transversely of said bars and supported thereby, each of said bars comprising top and bottom channel-shaped sections telescoped with respect to each other; and plate spring means interposed between said top and bottom sections.

16. In a meat rack for refrigerator cars, the combination with spaced bars supported on the car structure; of spaced meat hook supporting means disposed transversely of said bars; and means for yieldingly supporting said beams on said bars.

17. In a meat rack for refrigerator cars, the combination with spaced bars supported on the car structure; of spaced meat hook supporting means disposed transversely of said bars; means for yieldingly supporting said beams on said bars, comprising a plurality of brackets fixed to each bar, each of said brackets having a guide section embracing a portion of one of said beams; and shock absorbing means carried by each bracket and interposed between the beam and bar.

18. In a meat rack for refrigerator cars, the combination with spaced bars supported on the car structure; of spaced meat hook supporting beams disposed transversely of said bars; means for yieldingly supporting said beams on said bars, comprising a plurality of brackets fixed to each bar, each of said brackets having a guide section embracing a portion of one of said beams; and shock absorbing spring means carried by said brackets for yieldingly supporting said beams on said bars.

19. In a meat rack for refrigerator cars, the combination with spaced bars suspended from the car structure; of spaced meat hook supporting beams arranged transversely of said bars and supported thereby, each of said bars being divided lengthwise into top and bottom telescoped sections; and yielding means interposed between said sections, said telescoped sections having shouldered engagement with each other to restrict relative approach of the same and limit the compression of said yielding means.

20. In a meat rack for refrigerator cars, the combination with spaced bars supported on the car structure; of spaced meat hook supporting beams disposed transversely of said bars; means for yieldingly supporting said beams on said bars, comprising a plurality of brackets fixed to each bar, each of said brackets having a guide section embracing a portion of one of said beams; shock absorbing spring means carried by said brackets for yieldingly supporting said beams on said bars; and means for limiting compression of said shock absorbing spring means.

In witness that I claim the foregoing I have hereunto subscribed my name this 16th day of July, 1931.

WILLIAM A. GEIGER.